(12) United States Patent
Irace

(10) Patent No.: US 9,916,467 B2
(45) Date of Patent: Mar. 13, 2018

(54) METHOD, SYSTEM AND COMPUTER PRODUCT FOR ACCESSING DATA OF A DATABASE IN A MES SYSTEM

(71) Applicant: SIEMENS AKTIENGESELLSCHAFT, Munich (DE)

(72) Inventor: Stefano Irace, Savona (IT)

(73) Assignee: Siemens Aktiengesellschaft, Munich (DE)

( * ) Notice: Subject to any disclaimer, the term of this patent is extended or adjusted under 35 U.S.C. 154(b) by 281 days.

(21) Appl. No.: 14/317,147

(22) Filed: Jun. 27, 2014

(65) Prior Publication Data

US 2015/0006477 A1    Jan. 1, 2015

(30) Foreign Application Priority Data

Jun. 27, 2013    (EP) ..................... 13174045

(51) Int. Cl.
*G06F 17/30*    (2006.01)
*G06F 21/62*    (2013.01)

(52) U.S. Cl.
CPC .... *G06F 21/6218* (2013.01); *G06F 17/30448* (2013.01); *G06F 21/6227* (2013.01)

(58) Field of Classification Search
CPC ......... G06F 17/30427; G06F 17/30448; G06F 17/3066; G06F 17/30932
See application file for complete search history.

(56) References Cited

U.S. PATENT DOCUMENTS

| | | | |
|---|---|---|---|
| 8,086,615 B2 | 12/2011 | Patrick et al. | |
| 2003/0208486 A1* | 11/2003 | Dettinger | .......... G06F 17/30389 |
| 2004/0162825 A1 | 8/2004 | Bhaghavan et al. | |
| 2004/0249792 A1* | 12/2004 | Halim | ............... G06F 17/30067 |
| 2005/0038783 A1* | 2/2005 | Lei | ..................... G06F 17/30522 |
| 2005/0246338 A1* | 11/2005 | Bird | .................... G06F 21/6227 |
| 2006/0026159 A1 | 2/2006 | Dettinger et al. | |
| 2007/0055658 A1* | 3/2007 | Hsiao | ................ G06F 17/30448 |

FOREIGN PATENT DOCUMENTS

WO    2006104810 A2    10/2006

* cited by examiner

*Primary Examiner* — Alexander Khong
(74) *Attorney, Agent, or Firm* — Laurence Greenberg; Werner Stemer; Ralph Locher

(57) ABSTRACT

A method and a system access data of a database in a MES system by a client application where the database access is required to satisfy a set of custom data protection rules depending on a set of user credentials. The method includes providing, at developing time a secure access layer for enabling the client application to access data to/from the database in a protected manner taking into account the set of custom data protection rules; and at runtime or engineering time by the client application, requesting, through a given authenticated user, data access to/from the database by sending to the secure access layer a given data access descriptor and the given user credentials of the given authenticated user. By the secure access layer, the received data access descriptor is processed to generate a given SQL statement for data access.

4 Claims, 1 Drawing Sheet

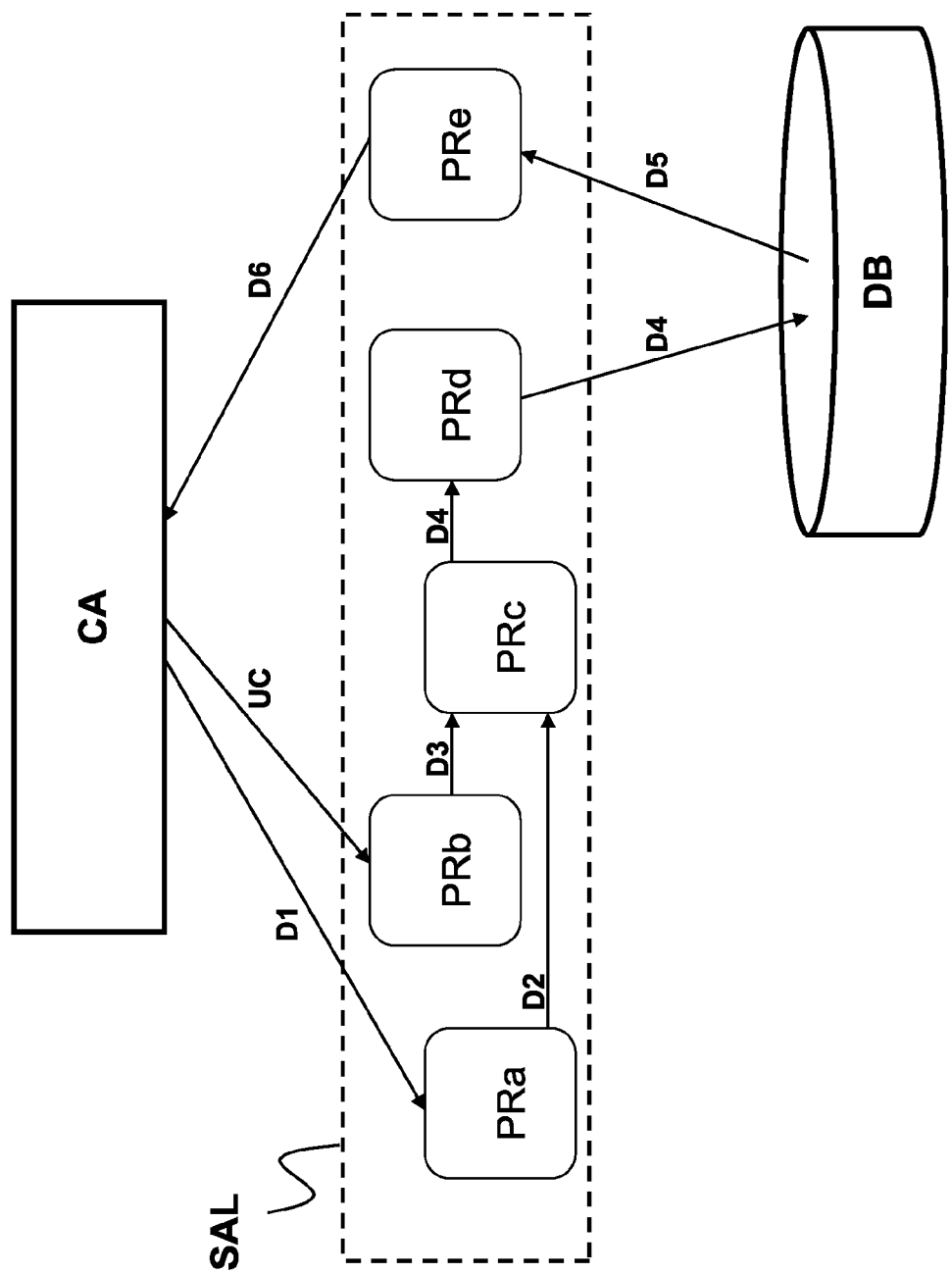

METHOD, SYSTEM AND COMPUTER PRODUCT FOR ACCESSING DATA OF A DATABASE IN A MES SYSTEM

CROSS-REFERENCE TO RELATED APPLICATION

This application claims the priority, under 35 U.S.C. § 119, of European application EP 13 174 045.8, filed Jun. 27, 2013; the prior application is herewith incorporated by reference in its entirety.

BACKGROUND OF THE INVENTION

Field of the Invention

The present invention relates to a system and a method for accessing data of a database in a MES system by a client application having an authenticated user, where the database access is required to satisfy a set of custom data protection rules depending on a set of user credentials.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated IT infrastructure that helps them in coordinating production on a global scale and, if necessary, in real time. The manufacturing execution system (MES) is generally known as the IT layer that integrates the business systems (e.g. ERP) and production control systems.

Siemens corporation offers a broad range of MES products, under its SIMATIC® IT product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred to as ISA-95 or S95.

The functions that a MES system usually includes are resource allocation and status, dispatching production orders, data collection/acquisition, quality management, maintenance management, performance analysis, operations/detail scheduling, document control, labor management, process management and product tracking.

Thus, the goal of MES systems developed by software suppliers is to provide manufacturing companies (the customers) with tools for measuring and controlling production activities with the aim of boosting profitability, increasing productivity, improving quality and process performance to manufacturing plants.

As used herein, a software application is a set of software components developed, by software developers during the software developing phase, enabling to perform some useful actions within a MES system, e.g. monitoring values coming from plant process or controlling a plant device.

Typically, at engineering or configuration time, system engineers flexibly customize MES applications according to the specific manufacturing plant requirements.

Instead, at runtime, MES applications are utilized by end-users who may be plant operators or line responsible personnel.

In a MES system, it is often required that at least some information to be accessed in a database, at engineering or run time, be regarded as "sensitive". Hence, it is a customer need that the access to such information be protected by regulating it for users and/or user groups.

In prior art methods, the data access regulation is achieved by having applications which support features for information protection.

Such applications suffer of the drawback of containing modules which are not centralized and have a low degree of configurability.

Another drawback of prior art techniques is the fact that the protection logics are typically hard coded directly into the application code, often in a fragmented manner.

Another drawback of prior art techniques is the fact that the protection logics are pre-codified directly on the data. In fact the fact that the protection logics are closely associated to the database structure implies that any database change requires a change in the application code.

Thus, in view of the above, known techniques used so far suffer from the now described disadvantages: they require high maintenance costs, they are error prone, and the efforts of process/system engineer in order to implement customer requirements on a project basis do require in depth software skills.

SUMMARY OF THE INVENTION

It is therefore aim of the present invention to overcome the above mentioned drawbacks and disadvantages, by providing a method and a system for accessing data of a database in a MES system, where the database access is required to satisfy a set of custom data protection rules where the protection logics are centralized and created on the basis of a data abstraction so that protection rules have no direct impact on the database structure.

The aforementioned aim is achieved by a method and a system for accessing data of a database in a MES system, the database data being accessed by a client application having an authenticated user, where the database access is required to satisfy a set of custom data protection rules depending on a set of user credentials. The invention includes at developing time providing a secure access layer for enabling the client application to access data to/from the database in a protected manner taking into account the set of custom data protection rules at runtime or engineering time by the client application. Through a given authenticated user, a data access to/from the database is requested by sending to the secure access layer a given data access descriptor and the given user credentials of the given authenticated user by the secure access layer. The received data access descriptor is processed so as to generate a corresponding given SQL statement for data access by the secure access layer. The set of custom data protection rules is processed together with the given user credentials so as to generate given SQL "where" clauses by the secure access layer. The given access SQL statement with the given SQL "where" clauses are extended so as to generate a given secure access SQL statement by the secure access layer. The database is accessed by executing the given secure access SQL statement by the database. The given results of the execution of the given secure access SQL statement are returned to the secure access layer via the database. The given results are processed via the secure access layer so as to generate a corresponding resulting logical representation to be sent to the client application.

According to a further feature of the invention, the data access is a read operation from the database; the data access descriptor is a data model descriptor; the given access SQL statement is a query "SELECT"; the given results are the retrieved data of the query "SELECT"; and the resulting logical representation is the resulting model object data of the retrieved data;

In accordance with a second inventive embodiment: the data access is a write operation to the database; the data access descriptor contains a data model descriptor and a model object data; the given access SQL statement is a command "INSERT, UPDATE or DELETE"; the given results are the resulting exit code of the command "INSERT, UPDATE or DELETE"; and the resulting logical representation is the resulting execution exit code.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Invention embodiments enable a general and centralized implementation with logical rules so that a variety of application architectures can be flexibly used.

With invention embodiments, custom data protection rules/logics are adapted to the data in a dynamic manner.

Embodiments of the invention enable that the database sensitive data are blocked directly on the server-side and that the protection mechanism is invoked systematically and dynamically for each data access operation to/from the database, preventing any possibility of bypassing the data protection requirements.

Embodiments of the invention allow integrating a sensitive data protection functionality into a MES application in an easy and quickly manner. In fact, the secure access layer advantageously enables to perform data access in a generic way and it facilitates the definition of an abstract data model. Moreover, thanks to the provision of the secure access layer, the MES application is conveniently not required to have knowledge of the database structure being the data exposed as data models, so that the application can maintain its compatibility in case of a change of the database structure.

Embodiments of the invention include the following technical advantages. They provide a standardized and a generic technique for coding access rules. There is no need of change to the source code to support new access policies. There is an easy maintainability of applications thus leading to cost reductions.

Other features which are considered as characteristic for the invention are set forth in the appended claims.

Although the invention is illustrated and described herein as embodied in a method, a system and a computer product for accessing data of a database in a MES system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram schematically illustrating a data access to/from a database by a client application through a secure access layer according to an example embodiment of the present invention.

DETAILED DESCRIPTION OF THE INVENTION

Referring now to the single FIGURE of the drawing in detail, at least some embodiments of the present invention address the above described issue in which database data is accessed in a MES system by a client application CA having an authenticated user, where database access is required to satisfy a set of custom data protection rules depending on a set of user credentials UC.

At developing time, a secure access layer SAL is provided for enabling the client application CA to access data to/from the database DB in a protected manner taking into account the set of custom data protection rules.

At runtime or engineering time, the database access is performed as follows:

the client application CA requests, through a given authenticated user, data access to/from the database DB by sending to the secure access layer a given data access descriptor D1 and a given user credentials UC of the given authenticated user;

the secure access layer SAL processes PRa the received data access descriptor so as to generate a corresponding given SQL statement for data access D2;

the secure access layer SAL processes PRb the set of custom data protection rules together with the given user credentials so as to generate given "where" clauses D3;

the secure access layer SAL extends PRc the given access SQL statement D2 with the given SQL "where" clauses D3 so as to generate a given secure access SQL statement D4;

the secure access layer SAL accesses PRd the database DB by executing the given secure access SQL statement D4;

the database DB returns to the secure access layer given results D5 of the execution of the given secure access SQL statement D4; and the secure access layer SAL processes PRe the given results D5 so as to generate a corresponding resulting logical representation D6 to be sent to the client application CA.

It is noted that the secure database access may be performed not only at runtime but also at engineering time since protection logics may also be required at engineering time during the configuration of sensitive data of the database DB. The custom data protection rules are preferably configured at engineering time.

In invention embodiments, the data access may be a read operation from the database DB or a write operation to the database DB.

As used herein the term "data access descriptor" is a generic term describing the logical data structure to be used for read and write operations.

In case the data access is a read operation, the data access descriptor is a data model descriptor.

In case the data access is a write operation, the data access descriptor contains a data model descriptor and a model object data.

As used herein, the term "data model descriptor" defines a data structure describing the information to be accessed and how to put it together. It is used as a "stand-alone" to perform read operations or in conjunction with the "model object data" to perform write operations.

As used herein, the term "model object data" defines a data structure describing a set of data values which refer to an instance of the data model descriptor as input of the write operation or as outcome of the read operation (one or more instances).

In write operations, the model object data is the input data necessary to perform write operations because it represents the data instance to be inserted, updated or deleted in the database DB.

In read operations, the resulting logical representation D6 is the resulting model object data representing one or more data instances retrieved from the database DB.

Case of Read Operations

In cases where the data access is a read operation from the database DB, the data access descriptor D1 is a data model descriptor. The given access SQL statement D2 is a query "SELECT". The given/authorized results D5 are the retrieved data of the query "SELECT". The resulting logical representation D6 is the resulting model object data of the retrieved data.

Case of Write Operations

In cases where the data access is a write operation to the database DB, the data access descriptor D1 contains a data model descriptor and a model object data. The given access SQL statement D2 is a command "INSERT, UPDATE or DELETE". The given/authorized results D5 are the resulting exit code of the command "INSERT, UPDATE or DELETE". The resulting logical representation D6 is a representation of the resulting execution exit code outcome. For example, such logical representation indicates the successful or failed outcome, e.g. in case of failure, also a readable description of the failure ground may be conveniently reported.

In inventive embodiments, the secure access layer SAL can be implemented as a main layer, e.g. called common data access interface (CDAI), and a sub-layer e.g. called for example data protection layer (DPL), included within the CDAI layer. The CDAI layer can be seen as a service for data abstraction between the client application and the database for performing access to data in a "general purpose"/common manner, i.e. not intended only for specific data but for common to the all data. The sub-layer DPL can be seen as a translator of logical restriction access rules for users and/or user groups SQL statements with "where clauses" extensions.

Example Embodiment I

Let us illustrate an example embodiment of a MES database DB containing two recipes called respectively "Skin Care Cream" and "Multi-Vitamin Tonic", where such two recipes describe the production process for two different pharmaceutical preparations.

The set of custom data protection rules depending on a set of user credentials require e.g. that:
the users belonging to group "Cosmetics" be able to access only the recipe "Skin Care Cream"; and
the users belonging to group "Quality Control" be able to access both recipes.

At engineering time, the above custom data protection rules are customized within the Secure Access Layer.

At runtime, e.g. during manufacturing operations, a user "Cosmetic Operator", belonging to the group "Cosmetics", logs into the MES management application, and opens an application with the "Recipes Management" page that is configured to work with a specific data source using a Secure Access Layer according to example invention embodiments. During this phase, the client application CA requests a read operation from the database DB to retrieve the records to display in page via a data access descriptor D1. The query D4 on the database is executed by the secure access layer SAL in a secure/protected manner by taking into account previously collected user credentials UC.

The secure access layer SAL takes the access rules related to the elements of type "recipes", converts them PRb into SQL "where clauses" and integrates them into PRc the SQL statement so as to obtain a secure query "SELECT" D4.

Finally SQL query is performed and the resulting rows are returned to the requesting page.

In conclusion, the page "Recipes Management" displays only the recipe for "Skin Care Cream", and there is no way for the user "Cosmetic Operator" to access the other recipes in the database DB.

Example Embodiment II

Let us illustrate another example embodiment where a MES application is required to display a detail window showing production order information and it is required to list the planned production operations. To achieve this with the proposed invention, the MES application can declare a "Data Model Descriptor" specifying that:
the "Production Order" and "Production Operation" logical objects are needed; and
the "Production Operation" object belongs to "Production Order" object.

The detail window would then allow to update the production order information using the existing "Data Model Descriptor" and the updated "Model Object Data".

The following is a summary list of reference numerals and the corresponding structure used in the above description of the invention.

MES—Manufacturing Execution System
SQL—Structured Query Language

The invention claimed is:

1. A method for accessing pre-stored data of a database in a manufacturing execution system (MES), the pre-stored data of the database being accessed by a client application having an authenticated user, where a database access is required to satisfy a set of custom data protection rules depending on a set of user credentials, which comprises the steps of:
during developing time, providing a secure access layer for enabling the client application to access the pre-stored data to/from the database in a protected manner taking into account the set of custom data protection rules, the secure access layer being connected to the database and the set of custom data protection rules being created at a logical data abstraction level;
during runtime or engineering time performing the steps of:
requesting, via the client application, through a given authenticated user, data access to/from the database by sending to the secure access layer a given data access descriptor and the given user credentials of the given authenticated user;

processing, via the secure access layer, the given data access descriptor so as to generate a corresponding given SQL statement for data access;

processing, via the secure access layer, the set of custom data protection rules together with the given user credentials so as to generate given SQL "where" clauses, the custom data protection rules having no direct impact on a structure of the database;

extending, via the secure access layer, the corresponding given access SQL statement with the given SQL "where" clauses so as to generate a given secure access SQL statement;

accessing, via the secure access layer, the database by executing the given secure access SQL statement;

returning, via the database, to the secure access layer given results of an execution of the given secure access SQL statement; and processing, via the secure access layer, the given results so as to generate a corresponding resulting logical representation to be sent to the client application.

2. The method according to claim 1, wherein:
the data access is a read operation from the database;
the given data access descriptor is a data model descriptor;
the corresponding given access SQL statement is a query "SELECT";
the given results are retrieved data of the query "SELECT"; and
the corresponding resulting logical representation is a resulting model object data of retrieved data.

3. The method according to claim 1, wherein:
the data access is a write operation to the database;
the given data access descriptor contains a data model descriptor and a model object data;
the corresponding given access SQL statement is a command selected from the group consisting of INSERT, UPDATE and DELETE;
the given results are a resulting exit code of the command "INSERT, UPDATE or DELETE"; and
the corresponding resulting logical representation is a resulting execution exit code.

4. A non-transitory computer readable medium having computer-executable instructions for performing a method for accessing pre-stored data of a database in a manufacturing execution system (MES), the pre-stored data of the database being accessed by a client application having an authenticated user, where a database access is required to satisfy a set of custom data protection rules depending on a set of user credentials, which method comprises the steps of:

during developing time, providing a secure access layer for enabling the client application to access the pre-stored data to/from the database in a protected manner taking into account the set of custom data protection rules, the secure access layer being connected to the database and the set of custom data protection rules being created at a logical data abstraction level;

during runtime or engineering time performing the steps of:
requesting, via the client application, through a given authenticated user, data access to/from the database by sending to the secure access layer a given data access descriptor and the given user credentials of the given authenticated user;

processing, via the secure access layer, the given data access descriptor so as to generate a corresponding given SQL statement for data access;

processing, via the secure access layer, the set of custom data protection rules together with the given user credentials so as to generate given SQL "where" clauses, the custom data protection rules having no direct impact on a structure of the database;

extending, via the secure access layer, the corresponding given access SQL statement with the given SQL "where" clauses so as to generate a given secure access SQL statement;

accessing, via the secure access layer, the database by executing the given secure access SQL statement;

returning, via the database, to the secure access layer given results of an execution of the given secure access SQL statement; and processing, via the secure access layer, the given results so as to generate a corresponding resulting logical representation to be sent to the client application.

* * * * *